US008842406B2

(12) United States Patent
Tseng et al.

(10) Patent No.: US 8,842,406 B2
(45) Date of Patent: Sep. 23, 2014

(54) OVER-CURRENT PROTECTION DEVICE

(75) Inventors: Chun Teng Tseng, Sanwan Township, Miaoli County (TW); Yi Nuo Chen, Taipei (TW); David Shau Chew Wang, Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 441 days.

(21) Appl. No.: 13/345,098

(22) Filed: Jan. 6, 2012

(65) Prior Publication Data

US 2013/0176655 A1 Jul. 11, 2013

(51) Int. Cl.
*H02H 5/04* (2006.01)

(52) U.S. Cl.
USPC ......... 361/93.8; 361/93.1; 361/106; 338/22 R

(58) Field of Classification Search
CPC ......... H02H 9/026; H02H 3/08; H02H 5/044; H02H 5/04; H03K 207/08; H03K 17/0822; G06F 1/206
See application file for complete search history.

(56) References Cited

U.S. PATENT DOCUMENTS

| | | | | |
|---|---|---|---|---|
| 6,713,210 | B1 | 3/2004 | Sato et al. | |
| 2004/0022001 | A1* | 2/2004 | Chu et al. | 361/103 |
| 2006/0055500 | A1* | 3/2006 | Burke et al. | 338/22 R |
| 2006/0152329 | A1* | 7/2006 | Bjorsell | 338/22 R |

FOREIGN PATENT DOCUMENTS

| | | | | |
|---|---|---|---|---|
| TW | 528210 | U | | 4/2003 |
| TW | 539229 | U | | 6/2003 |
| TW | 200516819 | | | 11/2003 |
| TW | 200522090 | | | 12/2003 |
| TW | 200735134 | | * | 9/2007 |
| TW | 200816252 | A | | 4/2008 |

* cited by examiner

*Primary Examiner* — Jared Fureman
*Assistant Examiner* — Terrence Willoughby
(74) *Attorney, Agent, or Firm* — Egbert Law Offices, PLLC

(57) ABSTRACT

An over-current protection device includes a resistive device, an insulation layer, an electrode layer and at least one electrically conductive connecting member. The resistive device includes a first electrode foil, a second electrode foil and a positive temperature coefficient (PTC) material layer laminated between the electrode foils. The insulation layer is formed on the surface of the first electrode foil, and the electrode layer is formed on the surface of the insulation layer. The conductive connecting member penetrates the electrode layer, the insulation layer and the first electrode foil for electrically connecting the electrode layer and the first electrode foil. The conductive connecting member is insulated from the second electrode foil. One of the first and second electrode foils is configured to electrically connect to a protective circuit module (PCM), and the other one is configured to electrically connect to an electrode terminal of a battery to be protected.

17 Claims, 8 Drawing Sheets

OVER-CURRENT PROTECTION DEVICE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to a passive component, and particularly to an over-current protection device.

2. Description of Related Art Including Information Disclosed Under 37 CFR 1.97 and 37 CFR 1.98.

Because the resistance of conductive composite materials having a positive temperature coefficient (PTC) characteristic is very sensitive to temperature variation, it can be used as the material for current sensing devices, and has been widely applied to over-current protection devices or circuit devices. The resistance of the PTC conductive composite material remains extremely low at normal temperature, so that the circuit or cell can operate normally. However, when an over-current or an over-temperature event occurs in the circuit or cell, the resistance instantaneously increases to a high resistance state (e.g. at least $10^2\Omega$), so as to suppress over-current and protect the cell or the circuit device.

U.S. Pat. No. 6,713,210 disclosed a circuit board with over-current protection function. As shown in FIG. 1, an IC device 2 is placed on a protective circuit module (PCM) 1, and a PTC device 3 is surface-mounted on the PCM 1. The PTC device 3 is a stack structure in which a PTC material layer 6 is laminated between nickel foils (or nickel-plated copper foils) 7 and 7'. The nickel foils 7 and 7' serve as electrodes for the PTC material layer 6. A nickel plate 4 serving as an external electrode is secured on the upper surface of the nickel foil 7, and a copper electrode 5 is soldered to the lower surface of the nickel foil 7' that is adjacent to the surface of the PCM 1. The nickel plate 4 and the copper plate 5 are symmetrical with reference to the PTC device 3.

In consideration of high voltage and high current in spot-welding, the PTC device 3 cannot be subjected to spot-welding directly, and needs to be first combined with a nickel plate 4 of a thickness preferably greater than 0.3 mm, so as to avoid damage to the nickel foils 7 and 7' of the PTC device 3 while spot-welding. However, the nickel plate 4 is usually attached to the PTC device 3 manually, which is detrimental to mass production and cost reduction.

BRIEF SUMMARY OF THE INVENTION

The present application provides an over-current protection device adapted to be associated with a PCM. The over-current protection device can be combined with the PCM or an external electrode by surface-mount technology such as reflow or by spot-welding, so as to facilitate mass production and effectively reduce manufacturing time and costs.

In accordance with an embodiment of the present application, an over-current protection device includes a resistive device, an insulation layer, an electrode layer and at least one conductive connecting member. The resistive device includes a first electrode foil, a second electrode foil and a PTC material layer laminated between the first electrode foil and the second electrode foil. The insulation layer is disposed on a surface of the first electrode foil. The electrode layer is disposed on a surface of the insulation layer. The conductive connecting member penetrates or goes through the electrode layer, the insulation layer and the first electrode foil to electrically connect the electrode layer and the first electrode foil. The conductive connecting member is insulated from the second electrode foil. One of the first electrode foil and the second electrode foil is electrically coupled to the circuit of the PCM, and the other one is electrically coupled to an electrode terminal of a battery to be protected.

In an exemplary embodiment, the over-current protection device further includes bond pads disposed on a surface of the second electrode foil, and solder mask are formed on an area of the surface of the second electrode foil other than the areas of the bond pads. The bond pads can be used for soldering the over-current protection device on the PCM surface. The electrode layer can be combined with an external electrode by reflow or spot-welding.

In another embodiment, the electrode layer of the over-current protection device can be surface-mounted on the PCM surface by reflow. The second electrode foil may be a copper foil or a copper foil with a tin layer disposed thereon, which can be combined with an external electrode by reflow or spot-welding.

BRIEF DESCRIPTION OF THE SEVERAL VIEWS OF THE DRAWINGS

The present application will be described according to the appended drawings in which.

DETAILED DESCRIPTION OF THE INVENTION

Figure 1:
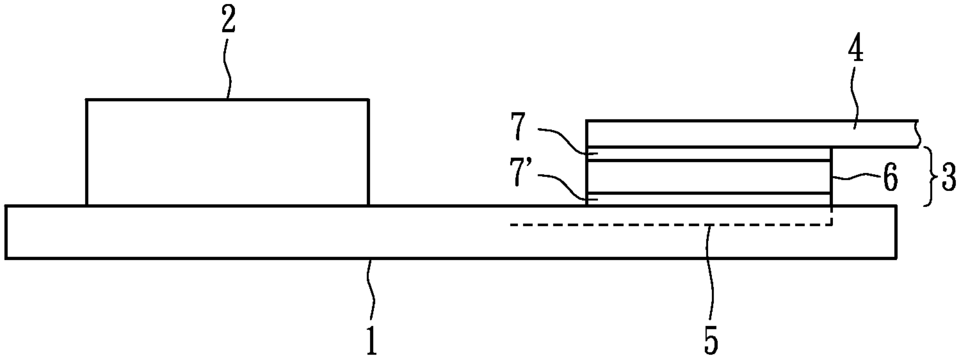
FIG. 1 (Prior Art)
FIG. 1 shows a known application of a PTC device on a PCM.
Figure 2A:
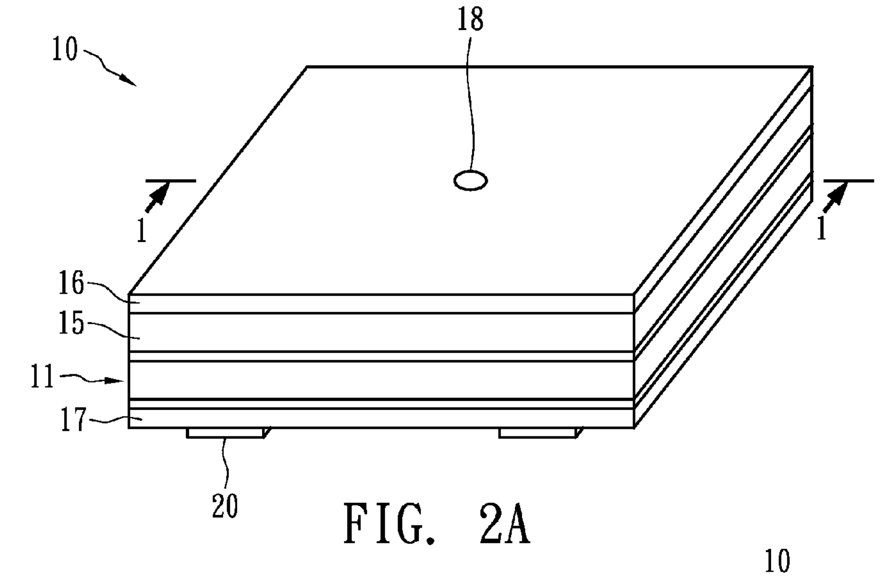
FIG. 2A to FIG. 2C show an over-current protection device in accordance with a first embodiment of the present application.
Figure 2B:
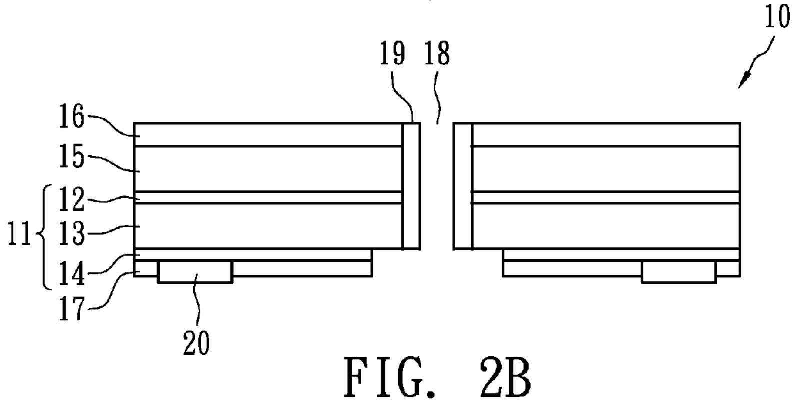
Figure 2C:
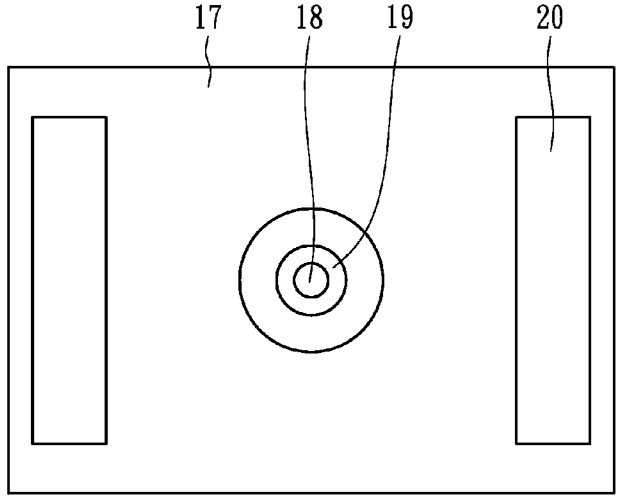

FIG. 2A to FIG. 2C show an over-current protection device in accordance with a first embodiment of the present application. FIG. 2A shows the three-dimensional structure of an over-current protection device 10. FIG. 2B is a cross-sectional view of the line 1-1 in FIG. 2A. FIG. 2C is a bottom view of the over-current protection device 10. The over-current protection device 10 essentially includes a resistive device 11, an insulation layer 15, an electrode layer 16 and a conductive connecting member 19. The resistive device 11 includes a first electrode foil 12, a second electrode foil 14, and a PTC material layer 13 laminated between the first electrode foil 12 and the second electrode foil 14. The insulation layer 15 is disposed on a surface of the first electrode foil 12, and the electrode layer 16 is formed on a surface of the insulation layer 15. The resistive device 11, the insulation layer 15 and the electrode layer 16 form a laminated layer.

The conductive connecting member 19 penetrates the electrode layer 16, the insulation layer 15 and the first electrode foil 12 at least, and electrically connects the electrode layer 16 and the first electrode foil 12. It should be noted that the conductive connecting member 19 is insulated from the second electrode foil 14. In this embodiment, the conductive connecting member 19 may be a plated through-hole 18, which penetrates the central area of the over-current protection device 10.

In practice, the second electrode foil 14 can be surface-mounted on the PCM surface directly. The electrode layer 16 may be a thick copper foil of a thickness greater than 50 μm, which may be formed by electroplating. Accordingly, the electrode layer 16 can be combined with an external electrode by spot-welding, or alternatively, a metal electrode may be formed on the electrode layer 16 for subsequent processing. To obtain preferable combination quality and manufacturing convenience, the bottom of the over-current protection device 10 may be provided with bond pads 20 those are formed on a surface of the second electrode foil 14. The area of the surface of the second electrode foil 14 other than bond pads 20 may be covered by solder masks 17. In this embodiment, the bond pads 20 are placed at two sides of the conductive connecting member 19. In an embodiment, the thickness of the bond pads 20 is equal to a little larger than that of the solder mask 17. Therefore, the bond pads 20 and the solder mask 17 have the same surface or the bond pads 20 slightly protrude from the surface of the solder mask 17. As a result, the bond pads 20 can serve as surface-mount interfaces to secure the over-current protection device 10 on the PCM surface.

In an embodiment, the electrode layer 16 may be copper foil, nickel foil or other metal foil and is adapted to undergo reflow or spot-welding. The copper foil may be a nickel-plated copper foil to prevent oxidation. The electrode layer 16 may be tin-plated copper foil whose surface may be further provided with a metal electrode. The material of the bond pads 20 may include tin or other metals. The insulation layer 15 may include polypropylene, glass fiber or epoxy resin.

Figure 3A:
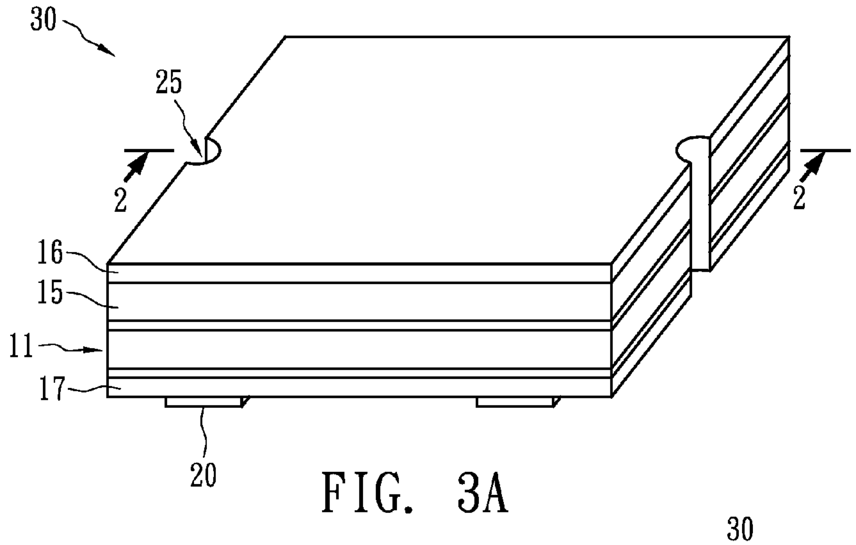
FIG. 3A to FIG. 3C show an over-current protection device in accordance with a second embodiment of the present application.
Figure 3B:
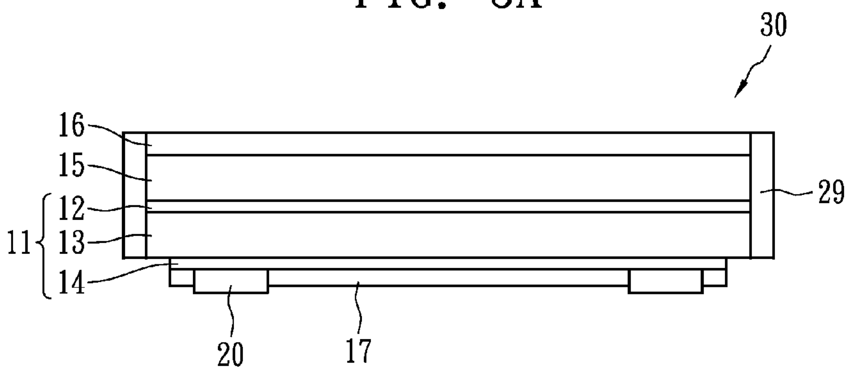
Figure 3C:
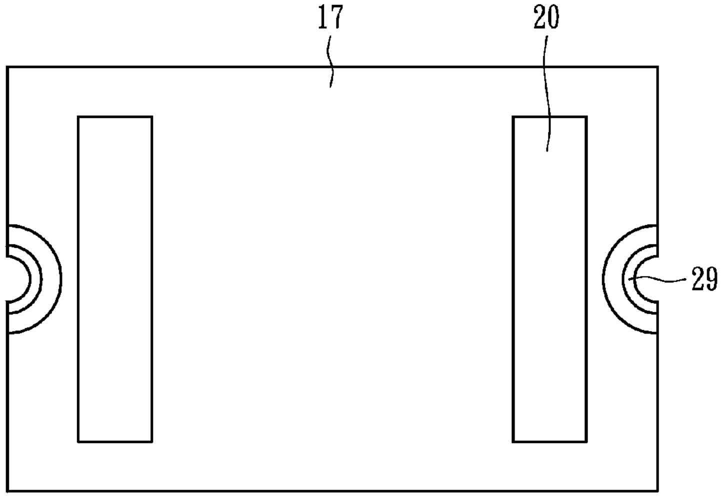

FIG. 3A to FIG. 3C show an over-current protection device in accordance with the second embodiment of the present application. FIG. 3A shows the three-dimensional structure of the over-current protection device 30. FIG. 3B is a cross-sectional view along the line 2-2 in FIG. 3A. FIG. 3C is a bottom view of the over-current protection device 30. The over-current protection device 30 is essentially equivalent to the device 10 of the first embodiment except that the plated through-hole 18 is replaced with two semi-circular holes 25 at two sides of the over-current protection device 30. The semi-circular holes 25 may be plated with conductive layers to form conductive connecting members 29. The conductive connecting member 29 penetrates the electrode layer 16, the insulation layer 15 and the first electrode foil 12 at least, and electrically connects the electrode layer 16 and the first electrode foil 12. It should be noted that the conductive connecting members 29 are insulated from the second electrode foil 14. The conductive connecting members are not restricted to the above-mentioned examples, the number or other types of conductive connecting members can be chosen upon various device structures to provide equivalent functions.

Figure 4A:
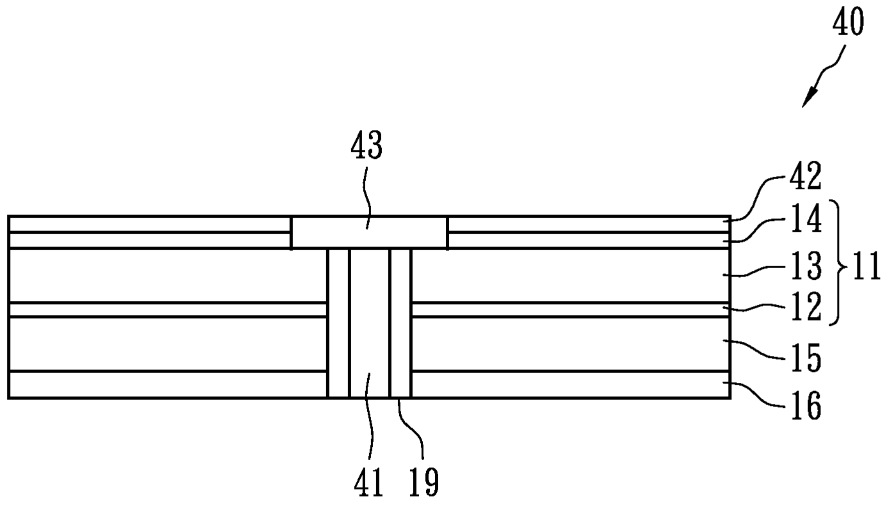
FIG. 4A and FIG. 4B show an over-current protection device in accordance with a third embodiment of the present application.
Figure 4B:
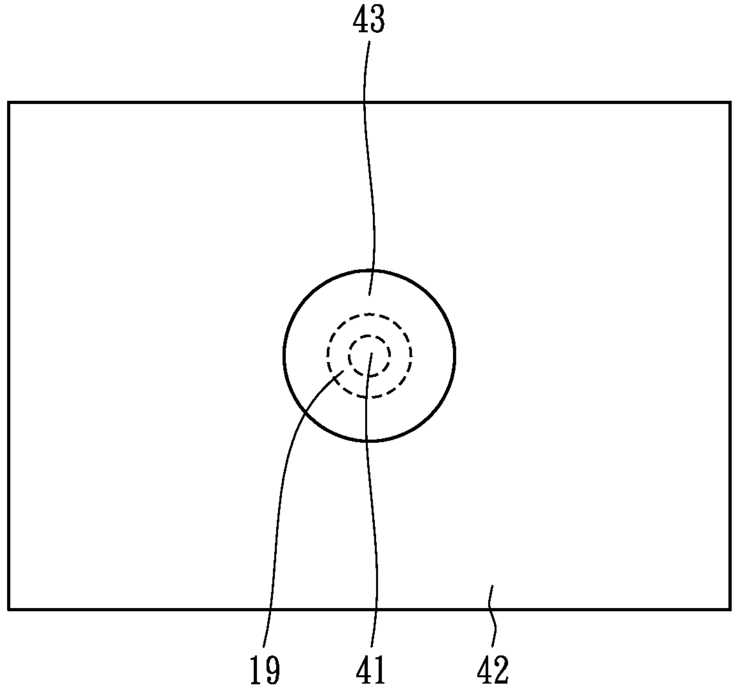

FIG. 4A and FIG. 4B show an over-current protection device 40 in accordance with a third embodiment of the present application. Compared with the over-current protection device 10 in FIGS. 2A to 2C using the electrode layer 16 to combine the external electrode and bond pads 20 to connect to PCM surface, the over-current protection device 40 is like an up-side down case, in which the electrode layer 16 may be surface-mounted on the PCM surface by reflow. The second electrode foil 14 can be a copper foil that may be plated with a tin layer 42. A solder mask 43 is formed at an end of the conductive connecting member 19 to insulate the conductive connecting member 19 from the second electrode foil 14 and the tin layer 42. The tin layer 42 is adapted to be in connection with an external electrode so as to electrically connect to an electrode terminal of a battery. In practice, the association of the second electrode foil 14 and the tin layer 42 act like the electrode layer 16 and may be replaced by single copper foil, nickel foil, nickel-plated copper foil or the like. Moreover, the hole of the conductive connecting member 19 may be filled with dielectric gel 41.

Figure 5A:
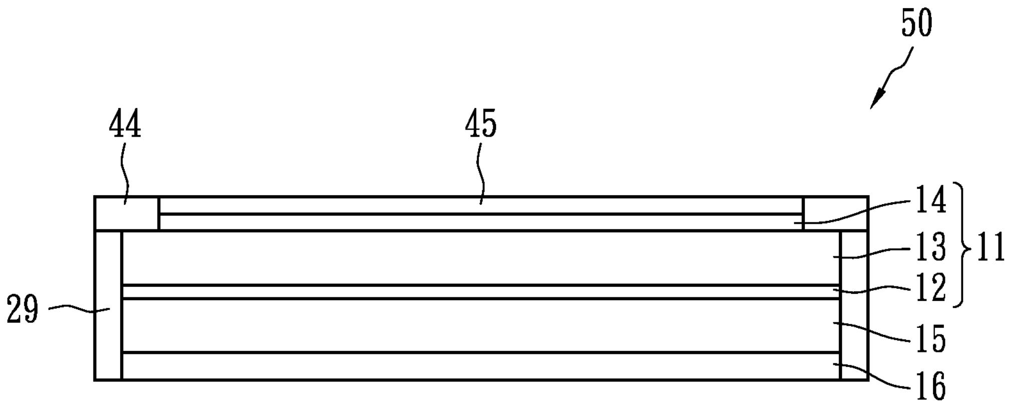
FIG. 5A and FIG. 5B show an over-current protection device in accordance with a fourth embodiment of the present application.
Figure 5B:
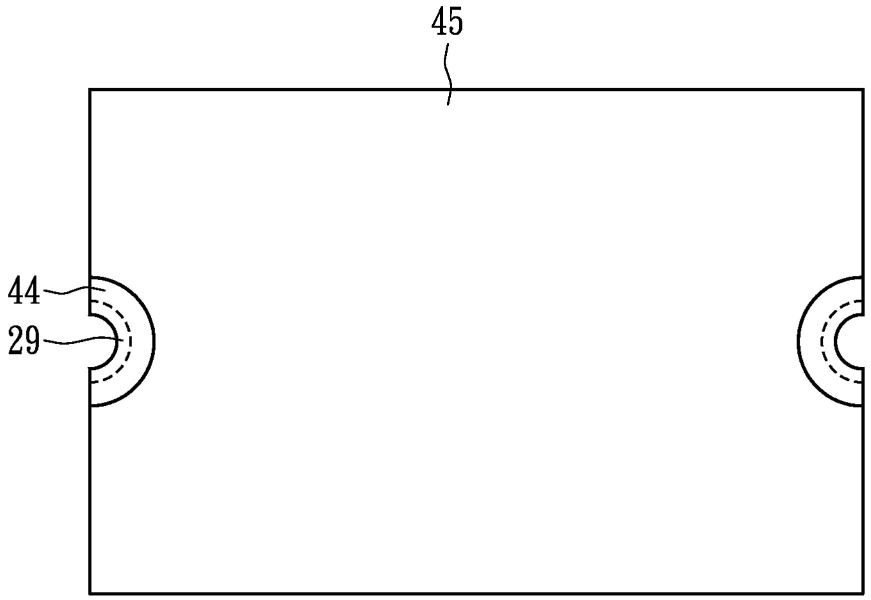

FIG. 5A and FIG. 5B show an over-current protection device 50 in accordance with the fourth embodiment of the present application. Compared with the over-current protection device 30 in FIGS. 3A to 3C using the electrode layer 16 to combine the external electrode and bond pads 20 to connect to PCM surface, the over-current protection device 50 is like an upside down case. Accordingly, the electrode layer 16 is adapted to be surface-mounted on the PCM surface by reflow. The second electrode foil 14 can be a copper foil that may be plated with a tin layer 45 according to this embodiment. A solder mask 44 is formed at an end of each of the conductive connecting members 29 to insulate the conductive connecting member 29 from the second electrode foil 14 and the tin layer 45. The tin layer 45 may be connected to an external electrode so as to electrically connect to an electrode terminal of a battery.

In FIGS. 5A and 5B, the semi-circular conductive connecting members 29 are disposed at two sides of the device 50, and they may be placed at corners of the device 50 alternatively. It should be noted that more conductive connecting members or other type conductive connecting members providing equivalent functions can be used also if needed.

Figure 6A:
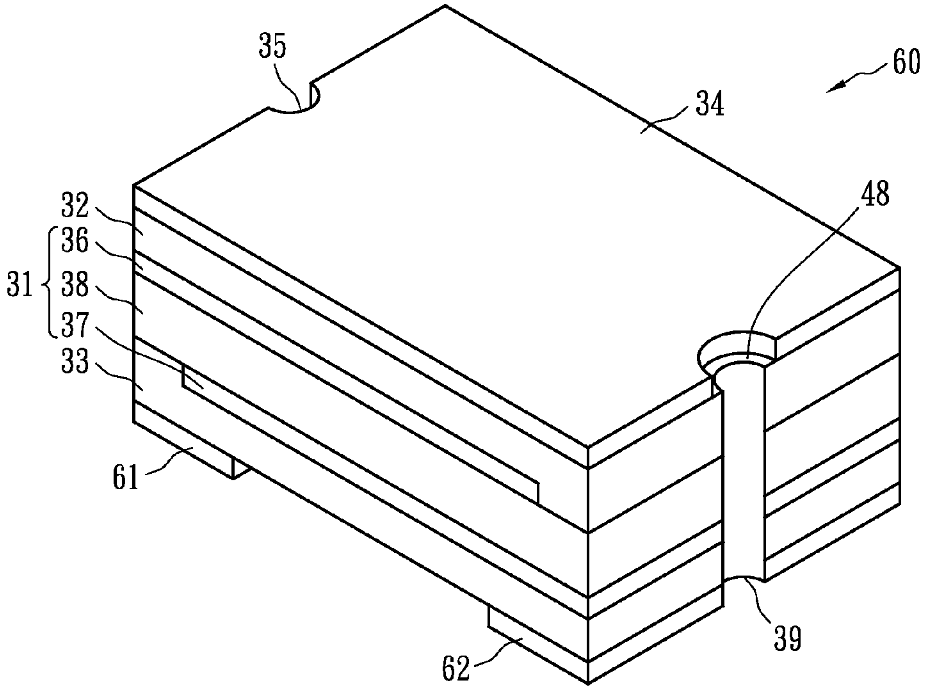
FIG. 6A and FIG. 6B show an over-current protection device in accordance with a fifth embodiment of the present application.
Figure 6B:
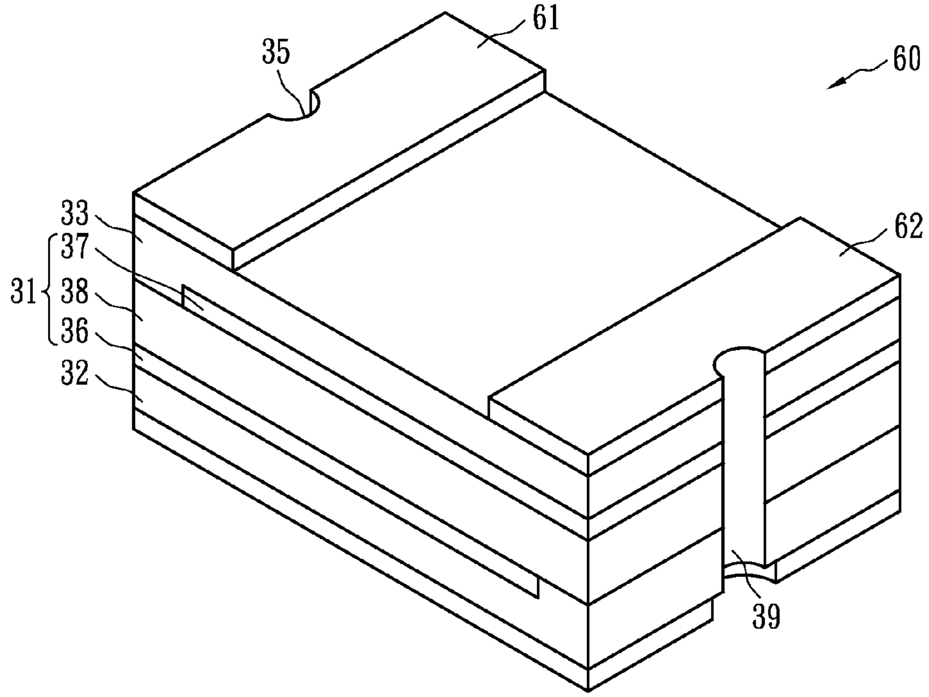

FIG. 6A shows an over-current protection device 60 in accordance with the fifth embodiment of the present application. FIG. 6B is an upside-down view of the device 60 shown in FIG. 6A. The over-current protection device 60 includes a resistive device 31, a first insulation layer 32, a second insulation layer 33, an electrode layer 34, conductive connecting members 35 and 39 and bond pads 61 and 62. The resistive device 31 includes a first electrode foil 36, a second electrode foil 37 and a PTC material layer 38 laminated between the first electrode foil 36 and the second electrode foil 37. The PTC material layer 38, the first electrode foil 36 and the second electrode foil 37 extend along a horizontal direction to form a lamination structure. The first insulation layer 32 is formed on a surface of the first electrode foil 36. The electrode layer 34 is formed on the first insulation layer 32. The conductive connecting members 35 and 39 are formed on sides of the device 60, and extend along a vertical direction which is substantially perpendicular to the horizontal direction. In an embodiment, the conductive connecting members 35 and 39 may be semi-circular holes plated with conductive films or the like. The conductive connecting member 35 electrically connects the electrode layer 34 and the first electrode foil 36, and the conductive connecting member 35 is insulated from the second electrode foil 37. The second electrode foil 37 is electrically coupled to the PCM through the conductive connecting member 39 and the bond pad 62. The electrode layer 34 has a circular notch 48 near the conductive connecting member 39, so that the electrode layer 34 is insulated from the conductive connecting member 39. The electrode layer 34 electrically coupled to the first electrode foil 36 is adapted to combine with an external electrode by reflowing, or preferably by spot-welding, and the external electrode is adapted to connect to an electrode terminal of a battery to be protected. The bond pad 62 may be surface-mounted on the PCM by reflow, and the bond pad 61 is used for being secured on the PCM only and is not electrically connected to the PCM. Accordingly, the bond pad 62 and the electrode layer 34 serve as a lower electrode to be coupled to the PCM and an upper electrode to be combined with the external electrode, respectively.

Figure 7:
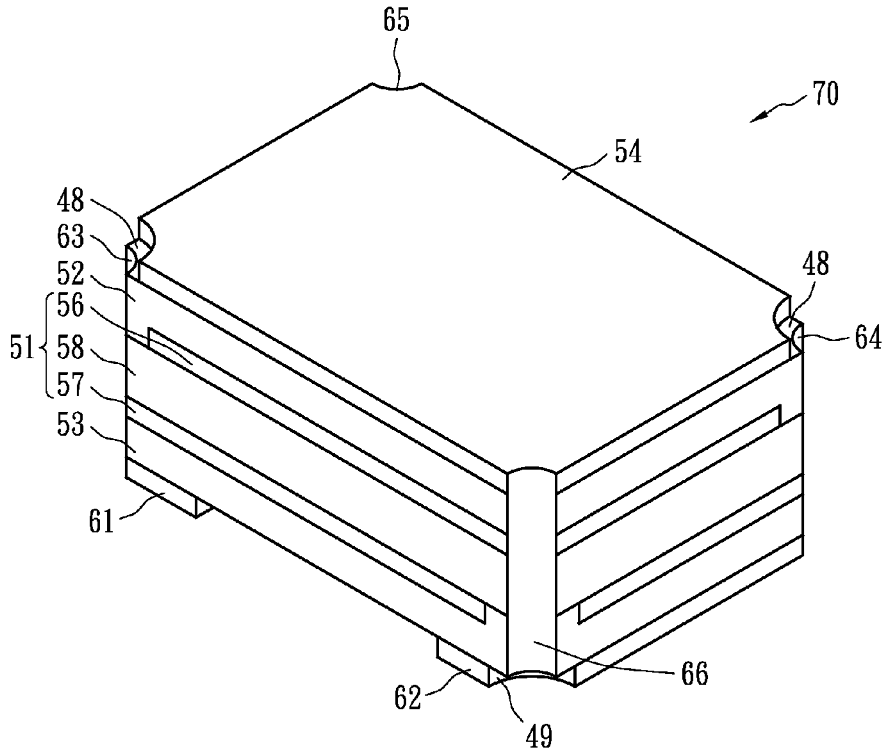
FIG. 7 shows an over-current protection device in accordance with a sixth embodiment of the present application.

FIG. 7 shows the over-current protection device 70 in accordance with the sixth embodiment of the present application. The difference of the devices 70 and the device 60 is that the conductive connecting member is formed at corners of the rectangular device. The over-current protection device 70 includes a resistive device 51, a first insulation layer 52, a second insulation layer 53, an electrode layer 54, conductive connecting members 63, 64, 65 and 66 and bond pads 61 and 62. The resistive device 51 includes a first electrode foil 56, a second electrode foil 57 and a PTC material layer 58 laminated between the first electrode foil 56 and the second electrode foil 57. The PTC material layer 58, the first electrode foil 56 and the second electrode foil 57 extend along a horizontal direction to form a lamination structure. The first insulation layer 52 is formed on a surface of the first electrode foil 56. The electrode layer 54 is formed on the first insulation layer 52. The conductive connecting members 65 and 66 extend along a vertical direction, so as to electrically connect the electrode layer 54 and the first electrode foil 56, and the conductive connecting members 65 and 66 are insulated from the second electrode foil 57. The second electrode foil 57 is electrically coupled to a PCM through the conductive connecting members 63 and 64 and the bond pad 61. The electrode layer 54 has circular notches 48 near the conductive connecting members 63 and 64, so that the electrode layer 54 is insulated from the conductive connecting members 63 and 64. The electrode layer 54 electrically coupled to the first electrode foil 56 is adapted to combine with an external electrode by reflowing, or preferably by spot-welding, and the external electrode is adapted to connect to an electrode terminal of a battery to be protected. The bond pad 62 is provided with a notch 49 near the conductive connecting member 66 for insulation between them. Likewise, the bond pad 61 near the conductive connecting member 65 also forms a notch for insulation. One of the bond pads 61 and 62 may be surface-mounted on and electrically connected to a PCM, and the other one is used for being physically secured to the PCM only. In this embodiment, the device is symmetrical; therefore the orientation of the device 70 needs not to be considered when jointing. Accordingly, the bond pad 61 or 62 and the electrode layer 54 serve as a lower electrode to be coupled to the PCM and an upper electrode to be connected to an external electrode, respectively.

According to the above-mentioned exemplary embodiments, the over-current protection device 10, 30, 40, 50, 60 or 70 has a surface to be secured to PCM and another surface adapted to connect to an external electrode. In an exemplary embodiment shown in FIG. 8A, the over-current protection device 40 (device 10, 30, 50, 60 or 70 can be used instead) has a surface secured to a PCM 80 and another surface connected to an external electrode 81. The external electrode 81 may be nickel plate or other metal plates and is adapted to be coupled to an electrode terminal of a secondary battery such as lithium-ion battery or lithium-polymer battery. The external electrode 81 may be combined with the over-current protection device 40 or the electrode terminal of the battery by reflow or spot-welding.

Figure 8A:
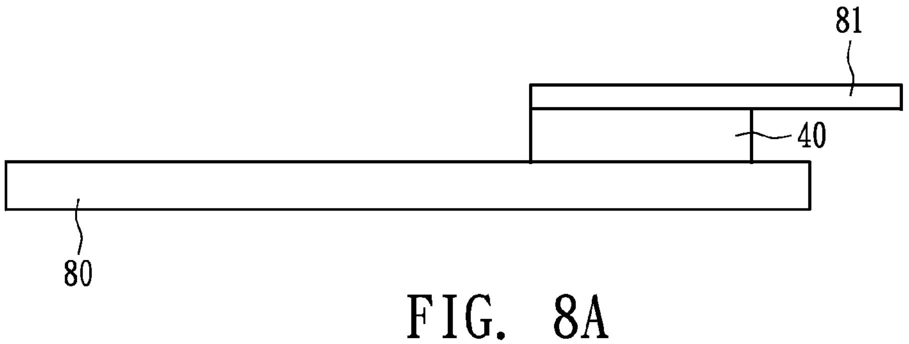
FIG. 8A to FIG. 8C exemplify the applications of over-current protection device of the present application.
Figure 8B:
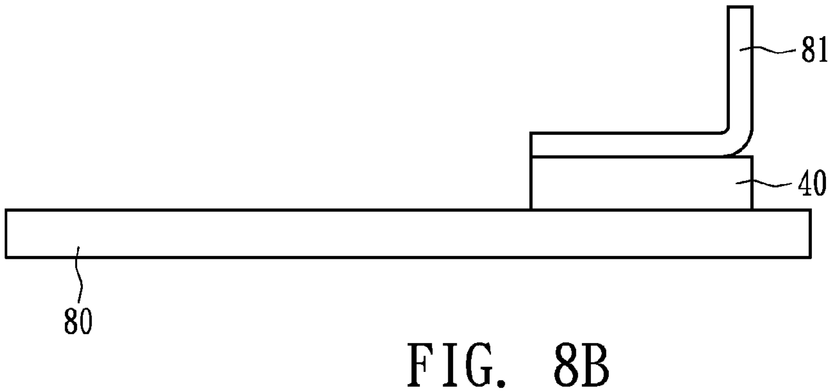
Figure 8C:
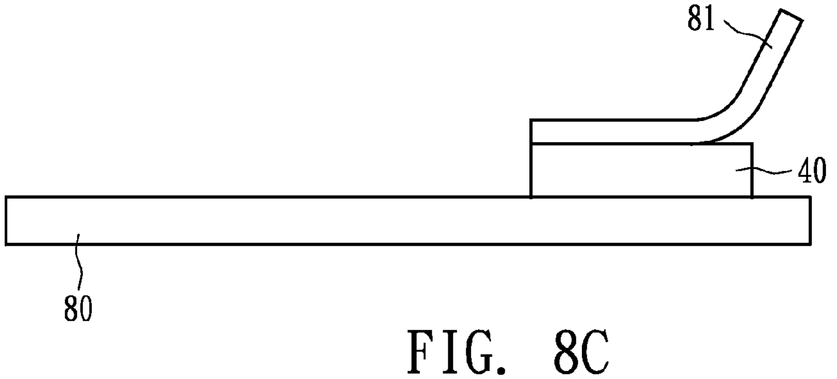

The external electrode 81 is of straight shape as shown in FIG. 8A, and may be of other shapes like L-shape in FIG. 8B or crooked shape in FIG. 8C to comply with various battery designs, so as to facilitate the connection of the external electrode and the electrode terminal of the battery.

Traditionally, the PTC device cannot connect to the nickel plate or other metal plate by spot-welding directly, and thus reflow is utilized instead. However, reflow usually performs at a temperature higher than 230° C., and may be detrimental to recovery behavior of the PTC resistive device. Because the over-current protection device can be combined with the external electrode by spot-welding according to the present application, it is only needed to consider the curing temperature of thermosetting epoxy of the over-current protection device. The curing temperature is usually below 200° C., and therefore it will not impact the recovery behavior of the PTC device.

The above-described embodiments of the present invention are intended to be illustrative only. Numerous alternative embodiments may be devised by persons skilled in the art without departing from the scope of the following claims.

We claim:

1. An over-current protection device adapted to be associated with a protective circuit module, the over-current protection device comprising:

a resistive device comprising a first electrode foil, a second electrode foil and a PTC material layer laminated between the first electrode foil and the second electrode foil;

a first insulation layer disposed on a surface of the first electrode foil;

an electrode layer disposed on a surface of the first insulation layer;

at least one first conductive connecting member penetrating the electrode layer, the first insulation layer and the first electrode foil to electrically connect the electrode layer and the first electrode foil, the first conductive connecting member being insulated from the second electrode foil;

an external electrode electrically connected to the first electrode foil or the second electrode foil, the external electrode having a straight shape or a crooked shape or an L-shape; and wherein one of the first electrode foil and the second electrode foil is configured to electrically couple to the protective circuit module, and the other one is configured to electrically couple to an electrode terminal of a battery, the external electrode being configured to electrically couple to the electrode terminal of the battery.

2. The over-current protection device of claim 1, wherein the second electrode foil serves as an interface for surface-mounting the over-current protection device on the protective circuit module.

3. The over-current protection device of claim 1, wherein the at least one first conductive connecting member is a plated through hole.

4. The over-current protection device of claim 1, wherein the at least one first conductive connecting member comprises semi-circular conductive holes at two sides of the over-current protection device.

5. The over-current protection device of claim 1, further comprising at least one bond pad disposed on a surface of the second electrode foil, the bond pad serving as an interface for surface-mounting the over-current protection device on the protective circuit module.

6. The over-current protection device of claim 5, further comprising a solder mask disposed on an area of the surface of the second electrode foil other than an area of the bond pad.

7. The over-current protection device of claim 6, wherein the bond pad has a thickness equivalent to that of the solder mask or protruding outwardly of the solder mask.

8. The over-current protection device of claim 1, further comprising a solder mask disposed at an end of the first conductive connecting member for electrically insulating the second electrode foil from the first conductive connecting member.

9. The over-current protection device of claim 1, further comprising a tin layer disposed on a surface of the second electrode foil, the tin layer being configured to be connected to the external electrode.

10. The over-current protection device of claim 9, wherein the external electrode is connected to the tin layer by reflow or spot-welding.

11. The over-current protection device of claim 1, wherein the over-current protection device is surface-mounted on the protective circuit module through the electrode layer.

12. The over-current protection device of claim 1, further comprising:

a second insulation layer disposed on a surface of the second electrode foil;

at least one bond pad disposed on a surface of the second insulation layer; and at least one second conductive connecting member penetrating the second electrode foil, the second insulation layer and the bond pad to electrically connect the second electrode foil and the bond pad, the second conductive connecting member being insulated from the first electrode foil.

13. The over-current protection device of claim 12, wherein the bond pad is configured to be surface-mounted on the protective circuit module, and the electrode layer is configured to be combined with an external electrode to electrically couple to the electrode terminal of the battery.

14. The over-current protection device of claim 12, wherein the PTC material layer, the first electrode foil and the second electrode foil extend along a first direction, and the first conductive connecting member and the second conductive connecting member extend along a second direction substantially perpendicular to the first direction.

15. The over-current protection device of claim 12, wherein the electrode layer is combined with the external electrode by spot-welding.

16. An over-current protection device adapted to be associated with a protective circuit module, the over-current protection device comprising:

a resistive device comprising a first electrode foil, a second electrode foil and a PTC material layer laminated between the first electrode foil and the second electrode foil;

a first insulation layer disposed on a surface of the first electrode foil;

an electrode layer disposed on a surface of the first insulation layer;

at least one first conductive connecting member penetrating the electrode layer, the first insulation layer and the first electrode foil to electrically connect the electrode layer and the first electrode foil, the first conductive connecting member being insulated from the second electrode foil;

at least one bond pad disposed on a surface of the second electrode foil, the bond pad serving as an interface for surface-mounting the over-current protection device on the protective circuit module; and a solder mask disposed on an area of the surface of the second electrode foil other than an area of the bond pad;

wherein one of the first electrode foil and the second electrode foil is configured to electrically couple to the protective circuit module, and the other one is configured to electrically couple to an electrode terminal of a battery.

17. An over-current protection device adapted to be associated with a protective circuit module, the over-current protection device comprising:

a resistive device comprising a first electrode foil, a second electrode foil and a PTC material layer laminated between the first electrode foil and the second electrode foil;

a first insulation layer disposed on a surface of the first electrode foil;

an electrode layer disposed on a surface of the first insulation layer;

at least one first conductive connecting member penetrating the electrode layer, the first insulation layer and the first electrode foil to electrically connect the electrode layer and the first electrode foil, the first conductive connecting member being insulated from the second electrode foil; and a tin layer disposed on a surface of the second electrode foil, the tin layer being configured to be connected to an external electrode;

wherein one of the first electrode foil and the second electrode foil is configured to electrically couple to the protective circuit module, and the other one is configured to electrically couple to an electrode terminal of a battery.

* * * * *